Aug. 8, 1967    R. L. VIERREGGER    3,334,914
ANCHORING DEVICE FOR LADING STRAPS AND OTHER
CARGO-BINDING ELEMENTS
Filed Feb. 7, 1966    2 Sheets-Sheet 1

RALPH L. VIERREGGER, INVENTOR

BY George R Nimmer

ATTORNEY

Aug. 8, 1967

R. L. VIERREGGER 3,334,914

ANCHORING DEVICE FOR LADING STRAPS AND OTHER
CARGO-BINDING ELEMENTS

Filed Feb. 7, 1966

RALPH L. VIERREGGER, INVENTOR

BY George R Nimmer
ATTORNEY

United States Patent Office 3,334,914
Patented Aug. 8, 1967

3,334,914
ANCHORING DEVICE FOR LADING STRAPS AND OTHER CARGO-BINDING ELEMENTS
Ralph L. Vierregger, 11664 Pierce St.,
Omaha, Nebr. 68144
Filed Feb. 7, 1966, Ser. No. 525,612
11 Claims. (Cl. 280—179)

This invention relates to anchoring devices for lading straps and other flexible cargo-binding elements used in conjunction with trucks, boats, and other cartage vehicles. In particular, this invention relates to an improved anchoring device especially adapted for the exterior surfaces of pick-up trucks and similar cartage vehicles having topless cargo compartments.

Cartage vehicles commonly include integral hook-like anchoring devices that are engageable with lading straps and other flexible cargo-binding elements, said cargo-binding elements being employed to stably position the cargo within the cartage vehicle. The hook-like anchoring devices of the prior art do invariably possess one or more of the following disadvantages. Nearly all of the prior art anchoring devices are difficult to install onto the transportation vehicle, requiring laborious and exacting effort on the part of properly-equipped and specially-trained mechanics. With many prior art anchoring devices, it is impossible to attach the device onto the exterior surface of thin panel members of the vehicle, as for example, onto the lighter gauge exterior steel panels. The hooked portion of certain prior art embodiments outwardly protrude in dangerous fashion, providing a source of possible injury to operating personnel. Further, with most prior art devices, the hooked portion is accessible to the lading strap from but a very narrow range of angular approach, thus necessitating a large number of strategically placed anchoring fixtures. Invariably the prior art devices will readily collect rain, snow, mud, and other aqueous matter, thus constituting a source of corrosive rust for the transportation vehicle. Nearly all of the prior art anchoring devices require exposed fastening means for attachment to the transportation vehicle, thus resulting in an unsightly accessory especially when employed on the exterior panels of the vehicle.

It is accordingly the general object of the present invention to obviate all of the aforementioned objectionable features of the prior art.

It is another object of the present invention to provide an anchoring device that can be readily and simply installed either within or adjacent to the cargo compartment of a transportation vehicle, without the necessity for recessing the device into the vehicular structural members.

It is another object of the present invention to provide an anchoring device that can be readily and simply installed onto thin exterior panels of a pick-up truck with concealed fastener means, to result in an aesthetically appealing utilitarian accessory.

It is another object to provide an anchoring device having a smoothly contoured exterior configuration, thus precluding the danger of physical injury to operating personnel.

It is yet another object to provide an anchoring device, the hooked portion of which is accessible from substantially all directions to a flexible cargo-binding element, thus minimizing the number of anchoring devices required.

It is still another object of the present invention to provide an anchoring device that will not retain deposits of aqueous matter, thus militating against the formation of corrosive rust at the adjacent ferrous panels of the vehicle.

With the above and other objects in view which will become apparent as the description proceeds, the invention comprises the novel form, combination, and arrangement of parts as hereinafter more fully described, reference being had to the accompanying drawings wherein like numbers refer to like parts in the several views and in which.

Figure 1:
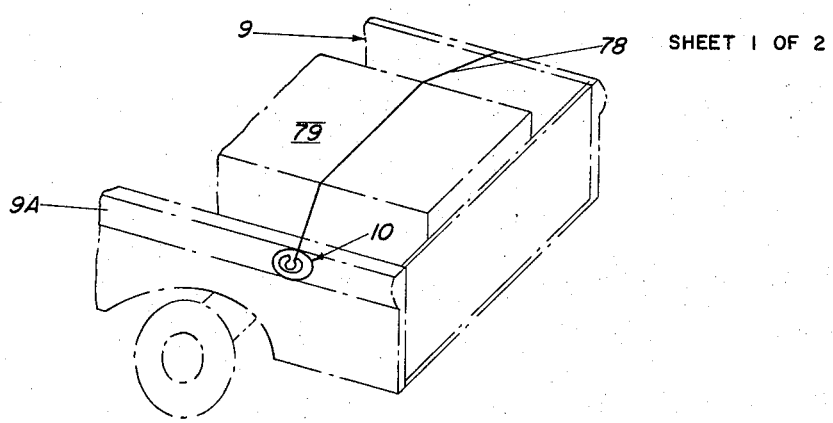
FIGURE 1 is a perspective view of the anchoring device of the present invention shown attached to the exterior surface of the sideward contoured panel of a loaded pick-up truck compartment, a flexible cargo-binding element being shown engaged with the anchoring device to secure a rectangular load.
Figure 2:
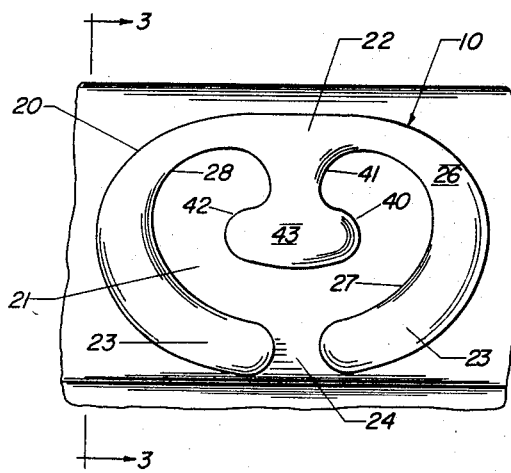
FIGURE 2 is a front elevational view of the anchoring device of the present invention, together with immediately adjacent areas of the pick-up truck sideward contoured panel.

As can best be seen in the FIGURE 1 perspective view, the anchoring device 10 is employed with transportation vehicles, herein as a pick-up truck 9, and is adapted to be engaged with cargo-binding elements e.g. a flexible lading strap 78, to securely position a load 79 within the vehicle 9. When used in the fashion illustrated in FIGURE 1 with a topless cargo compartment e.g. the open rearward end of pick-up truck 9, one or more opposed pairs of the anchoring device 10 is employed, each device being abuttably attached against the exterior surface of the sideward contoured panel 9a comprising the vehicle's cargo compartment.

As shown in FIGURES 2–5, the anchoring device 10 comprises an annular collar member 20 and a T-shaped anchoring post 40, said collar 20 and post 40 being integrally joined together, as for example, anchoring device 10 being provided as a one-piece forging.

Figure 3:
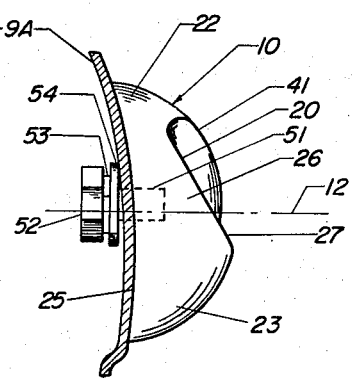
FIGURE 3 is a sectional view taken along line 3—3 of FIGURE 3 showing a side elevational view of the anchoring device together with the preferred means for attaching same to the pick-up truck sideward panel.
Figure 5:
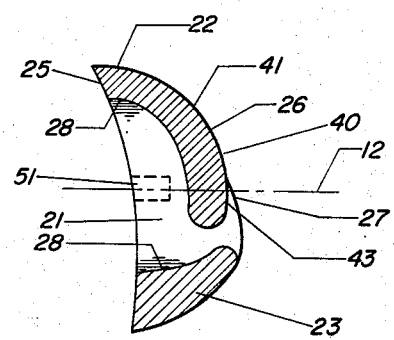
FIGURE 5 is a sectional elevational view of the anchoring device taken along line 5—5 of FIGURE 4.

Collar member 20 substantially surrounds and is substantially normal to a central axis 12, said central axis 12 being indicated in phantom line in FIGURES 3 and 5, to provide a central aperture 21. Collar member 20 is preferably of non-circular elongate shape e.g. elliptical, and anchoring post 40 is attached to a first elongate side 22. Preferably, the second elongate side 23 of collar member 20 includes a gap-like discontinuity 24 so that the collar 20 incompletely surrounds central aperture 21. Rearward surface 25 of collar member 20 is of smooth linearly-generated configuration in order to facilitate firmly abuttable attachment of the device 10 against the exterior surface of vehicle sideward panel 9a. For example, appropriate to the case of linearly-generated convex sideward panels e.g. panels 9a shown in FIGURES 1–3, rearward surface 25 is accordingly of linearly-generated concave configuration.

The outer surface 26 of collar member 20 converges or tapers forwardly from rearward surface 25 toward central axis 12, surface 26 terminating at a forward edge extremity 27 for collar 20. Thus, the rearwardly projected area of forward extremity 27 is smaller than and completely surrounded by the peripheral boundary of rearward surface 25. The rearward extremity of smoothly convex outer surface 26 is nearer to rearward surface 25 than to collar forward extremity 27, and preferably, surface 26 intersects the entire periphery of rearward surface 25 so as to minimize peripheral interference with a lading strap e.g. 78. In order to further minimize lateral interference with a lading strap at the upper or first elongate side 22, the distance between collar member rearward surface 25 and forward extremity 27 is greater at the second elongate side 23 than at the first elongate side 22.

The stem 41 of T-shaped anchoring post 40 is attached at the inner surface 28 of collar member 20, and stem 41 partially spans central aperture 21. Cross-bar free end 42 of anchoring post 40 is nearer to second elongate side 23 than to first elongate side 22, and cross-bar free end 42 is spaced a finite distance from collar member inner surface 28 to provide clearancee for the looping therearound of a cargo-binding elements 78. In order to prevent physical injury to operating personnel, the entire forward surface 43 of the anchoring post cross-bar portion is recessed behind the collar member forward extremity 27 toward collar member rearward surface 25.

Anchoring device 10 has means for attaching said device to the transportation vehicle. One such attachment means is a pair of opposed threaded perforations 51, each of said perforations being substantially parallel to central axis 12. Threaded perforations 51 extend but partially through collar member 20, intersecting rearward surface 25 only. Abuttable attachment of the anchoring device rearward surface 25 against the curvilinear exterior contour of vehicle panel 9a is desirably accomplished by means of a pair of threaded bolt fastener means, each passing through a smaller lock-washer 53, a larger ring-washer 54, and a suitable perforation in vehicle panel 9a. As an attachable article of commerce, the anchoring device 10 is marketed with the bolts 52 threadably engaged with perforations 51, the washers 53 and 54 surrounding the shank of bolt 52.

An alternate attachment means employs a pair of non-threaded perforations positioned analagously to threaded perforations 51, but extending completely through collar member 20 so as to intersect both rearward surface 25 and outer surface 26. In this alternate situation, the fastener means would necessarily extend forwardly of outer surface 26, thus detracting from the aesthetic appeal of the anchoring device forward portion and providing possible physical injury to operating personnel.

Since central aperture 21 is a likely place for snow and rain to accumulate, thus creating the danger for harmful rust corrosion to adjacent areas of panel 9a, gap 24 provides an egress for aqueous matter to minimize the likelihood for rust formation. However, for geographical areas having arid climatical conditions e.g. desert areas, the gap feature 24 is non-essential and collar member 20 could completely surround central aperture 21.

Figure 6:
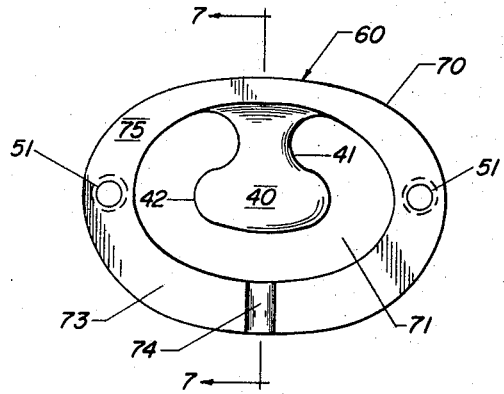
FIGURE 6 is a rearward elevational view of an alternate form of the anchoring device of the present invention.
Figure 7:
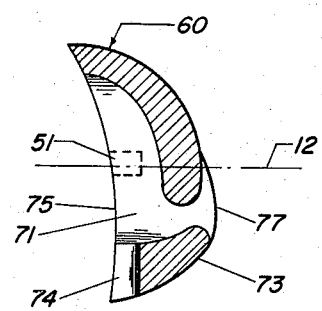
FIGURE 7 is a sectional elevational view taken along line 7—7 of FIGURE 6.
Figure 4:
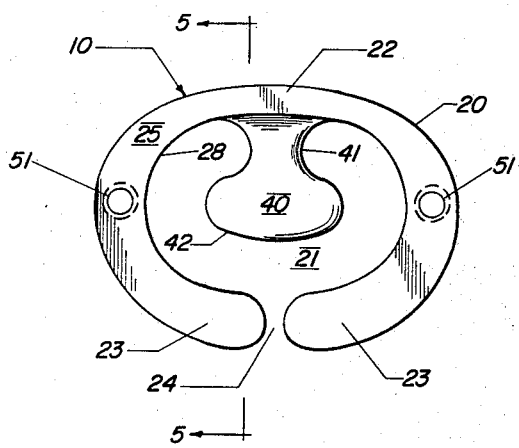
FIGURE 4 is a rearward elevational view of the anchoring device shown separately and detached from the pick-up truck.

The alternate anchoring device 60 as shown in FIGURE 6 and 7 is, with the following exceptions, identical to that shown in the FIGURES 2–5 preferred embodiment. Collar member 70 having central aperture 71 completely surrounds central axis 12. Second elongate side 73 of collar 70 includes a transversely grooved portion 74 at the rearward surface 75. Thus, grooved portion 74 provides a slot at the juncture between anchoring device 60 and a transportation vehicle e.g. panel 9a and said slot provides an egress for liquefied aqueous matter. Moreover, since groove 74 is invisible as device 10 is viewed from its forward edge extremity 77, a very pleasing aesthetic appearance results. However, since viscous and solidified aqueous matter cannot be as readily removed through transverse groove 74 as through collar gap 24, the FIGURES 2–5 embodiment is preferred for those conditions where mud, snow, and ice is normally encountered.

Figure 8:
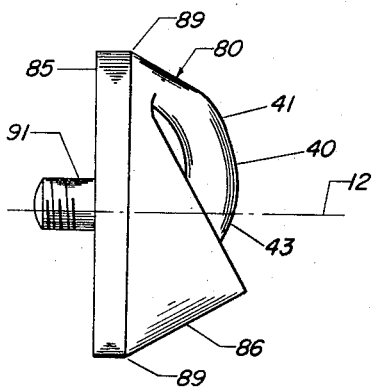
FIGURE 8 is a side elevational view of an alternate form of the anchoring device of the present invention.

The alternate anchoring device 80 as shown in FIGURE 8 is, with the following specific exceptions, identical to that shown in the preferred embodiment. Convex outer surface 86 is linearly generated in the matter of a conical frustum, and the rearward extremity 89 of collar member outer surface 86 is separated a finite distance from collar member planar rearward surface 85. The attachment means includes a pair of integral threaded studs e.g. 91, positioned in analogous fashion to the threaded perforation 51 type attachment means. Threaded studs 91 are substantially parallel to central axis 12, and are engageable with threaded nut fastener means (not shown).

Anchoring devices for the present invention made as a metallic one-piece or monolithic forging are exceptionally strong and compact and may be produced at a relatively low labor and material cost.

While the aesthetically pleasing appearance and the novel anchoring means of the anchoring device renders the device especially suitable for attachment to exterior surfaces of cartage vehicles, obviously the anchoring device may also be attached to internal surfaces within the cargo compartment as, for example, within a roofed trailer.

Although the rearward surface of the anchoring device is desirable of linearly generated configuration for abuttable attachment of the device against similarly linearly generated panels, the device can also be utilized in conjunction with quite irregular surfaces provided that a resiliently conformable gasket is disposed between the anchoring device rearward surface and the vehicular surface to which the device is to be attached.

From the foregoing, the construction and operation of the anchoring device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:
1. An anchoring device for lading straps and other flexible cargo-binding elements used in pick-up trucks and other cartage vehicles, said anchoring device comprising as a one-piece forging an annular collar member and a T-shaped anchoring post, said annular collar member substantially surrounding a central axis normal to said collar member to provide a central aperture, the annular collar member having a rearward surface and an outer surface terminating at a forward extremity, the annular collar outer surface having a contour that convergently tapers forwardly and inwardly toward the central axis to provide a forward extremity for the annular collar member, the rearward extremity of said annual collar outer surface being nearer to the collar rearward surface than to the collar forward extremity, said integral T-shaped anchoring post extending inwardly from the inner surface of said collar member, the stem of said anchoring post transversely spanning a major portion of said central aperture, the cross-bar free end of said anchoring post being spaced from the inner surface of the collar member to provide clearance for the looping of the cargo-binding element around said anchoring post, the entire forward surface of the anchoring post cross-bar portion being recessed behind the collar member forward extremity toward the collar member rearward surface.

2. The anchoring device of claim 1 having means engaged therewith for attaching the anchoring device to the transportation vehicle.

3. The anchoring device of claim 1 wherein the annular collar member is provided with a plurality of perforations substantially parallel to said central axis for attachment of the anchoring device to the transportation vehicle.

4. The anchoring device of claim 2 wherein the attachment means is a plurality of threaded studs attached to the rearward surface of collar member.

5. The anchoring device of claim 3 wherein the perforations are threaded and intersect the rearward surface only of the collar member.

6. The anchoring device of claim 1 wherein the collar member outer surface is of smoothly convex configuration and intersects the rearward surface, said rearward surface being of linearly generated configuration.

7. The anchoring device of claim 1 wherein the outer surface of the anchoring post is linearly generated and wherein the collar member outer surface is linearly generated in the manner of a conical frustum.

8. The anchoring device of claim 1 wherein the collar member is of non-circular elongate shape, wherein the anchoring post is attached to a first elongate side of the collar member, wherein the second elongate side of the collar member includes a gap-like discontinuity so that the collar incompletely surrounds the central opening, and wherein the distance between the collar member rearward surface and the collar member forward extremity is greater at the second elongate side than at the first elongate side.

9. The anchoring device of claim 2 wherein the collar member rearward surface is of curvilinear configuration and is abuttably attached against the curvilinear surface of a transportation vehicle.

10. The anchoring device of claim 5 wherein the collar member rearward surface is attached to a cartage vehicle.

11. The anchoring device of claim 2 wherein the collar member completely surrounds the central axis thereof and wherein the second elongate side of the collar member is transversely grooved at the collar member rearward surface.

References Cited

UNITED STATES PATENTS

| | | | |
|---|---|---|---|
| 2,876,729 | 3/1959 | Georgette | 105—369 |
| 3,190,253 | 6/1965 | Grimm | 105—369 |
| 3,257,971 | 6/1966 | Swendsen | 114—218 |

BENJAMIN HERSH, *Primary Examiner.*

L. D. MORRIS, *Assistant Examiner.*